United States Patent

Ferguson

(10) Patent No.: US 9,122,284 B2
(45) Date of Patent: Sep. 1, 2015

(54) ELECTROMECHANICAL TEMPERATURE REGULATION SYSTEM FOR PROVIDING TEMPERED MIX WATER

(71) Applicant: PVI Industries, LLC, Fort Worth, TX (US)

(72) Inventor: Mark A. Ferguson, Fort Worth, TX (US)

(73) Assignee: PVI Industries, LLC, Fort Worth, TX (US)

( * ) Notice: Subject to any disclaimer, the term of this patent is extended or adjusted under 35 U.S.C. 154(b) by 493 days.

(21) Appl. No.: 13/658,934

(22) Filed: Oct. 24, 2012

(65) Prior Publication Data

US 2014/0110487 A1   Apr. 24, 2014

(51) Int. Cl.
  *G05D 23/19*    (2006.01)
  *G05D 23/13*    (2006.01)

(52) U.S. Cl.
  CPC ........ *G05D 23/1917* (2013.01); *G05D 23/1306* (2013.01); *G05D 23/1393* (2013.01)

(58) Field of Classification Search
  CPC ......... F16K 11/00; F16K 19/00; G05D 23/13; G05D 23/1306; G05D 23/1393
  USPC ........................ 236/12.1, 12.11, 12.12, 12.13
  See application file for complete search history.

(56) References Cited

U.S. PATENT DOCUMENTS

| | | | |
|---|---|---|---|
| 4,669,653 A * | 6/1987 | Avelov | ............. 236/12.13 |
| 5,350,112 A | 9/1994 | Stein | |
| 6,119,947 A | 9/2000 | Couture et al. | |
| 6,270,014 B1 | 8/2001 | Bollas et al. | |
| 6,405,932 B1 | 6/2002 | Palmer | |
| 7,168,628 B2 | 1/2007 | Sheeran et al. | |
| 2004/0041034 A1 | 3/2004 | Kemp | |
| 2005/0150965 A1* | 7/2005 | Taylor et al. | ............. 236/12.1 |
| 2012/0104107 A1 | 5/2012 | Goncze | |
| 2012/0138157 A1 | 6/2012 | Eveleigh et al. | |

OTHER PUBLICATIONS

Guardian Equipment; product webpage; Tempering Valves; Product No. G3850; 2 pages; copyright 2012.

* cited by examiner

*Primary Examiner* — Jonathan Bradford
(74) *Attorney, Agent, or Firm* — Charles D. Gunter, Jr.

(57) ABSTRACT

A thermostatic mixing valve is used in a tempered water blending system. A cold water bypass line in the system acts under the control of a modulating valve and electronic controller to divert cold water back to a temperature sensing element in the mixing valve. By flooding the temperature sensing element, the mixing valve detects a false temperature and adjusts its flow rate of hot and cold water accordingly. The electronic controller acts in reverse of normal fashion, providing negative feedback to the sensing element of the mixing valve.

13 Claims, 6 Drawing Sheets

ELECTROMECHANICAL TEMPERATURE REGULATION SYSTEM FOR PROVIDING TEMPERED MIX WATER

BACKGROUND OF THE INVENTION

1. Field of the Invention

The present invention relates to tempered water mixing systems where cold and hot water supplies are thermostatically blended to provide a tempered discharge outflow of water at a selected temperature.

2. Description of the Prior Art

Thermostatic mixing valves (TMVs) have been in use for many years to control the temperature of water supplied to a delivery point. Thermostatic control valves of this general type are well known, e.g., as shown in U.S. Pat. Nos. 4,739,793; 4,767,052; and 5,647,531. These valves are well known to those skilled in the art. TMVs are capable of delivering water at a preset temperature, as well as preventing water flow in the event of the failure of the cold water supply. They are used extensively in hospitals, nursing homes and similar facilities. A particular application would be, for example, for supplying water to plumbing fixtures such as showers, large medical bathing systems or as a master mixing valve supplying numerous plumbing fixtures simultaneously. These valve systems are often installed in bath and shower areas, to regulate the flow of bathing water and to ensure precise water temperature in varying supply water conditions. A typical example is a valve that maintains shower water temperature when another water appliance is being operated. A sudden drain on the cold water supply may drop the cold water pressure, while leaving the hot water pressure relatively constant, thus increasing outlet water temperature due to an imbalance between hot and cold inlet water flow. The TMV is used to accommodate such variances while maintaining a preset outlet temperature.

Mechanical TMV's operate using a temperature sensitive element such as, for example, a bimetallic element or a spring element. In use, hot and cold water is supplied to the valve via respective hot and cold inlets. The water mixes inside the valve and is then delivered to a desired location through an outlet. In use the temperature sensitive element is linked to the hot and cold inlets so as to control the flow of hot and cold water into and thru the valve.

If the resulting mixed water temperature is too hot, the temperature sensitive valve element will typically expand or move in response to the temperature increase. This causes the flow of water through the hot water inlet to be reduced and/or the flow of water through the cold water inlet to be increased. This in turn causes a corresponding reduction in the mixed water temperature.

Similarly, if the mixed water temperature falls to low, the temperature sensitive element will contract, or move in the opposite direction, causing the hot water inlet to be opened further and/or the cold water inlet to be closed further, thereby causing the mixed water temperature to increase. In this manner, the TMV can be used to provide water at a predetermined temperature.

One disadvantage of this typical class of mechanical TMV is that valves of this type tend to be quite expensive, for example, on the order of $8000-$10,000 per valve. Another disadvantage of the prior art temperature balancing valves and many electronically controlled mixing valves described in the prior art is the inability to stabilize outlet water temperature at extremes of flow rate. This is due to several technical issues such as the velocity of water in the plumbing lines, the thermal lag of the water temperature sensor and mechanical overshoot in the thermal governor cartridge assembly or motor/belt drive of electronically controlled thermostatic valves.

A need exists, therefore, for an electromechanical temperature regulation system for providing tempered mix water which is simple in design and yet reliable in operation and which can be produced more economically than presently available TMV systems.

A need exists for such a system for providing tempered water at a preset temperature without significant temperature fluctuation.

A need exists for such a system having a desired response time for the establishment of a steady flow of tempered water having the desired preset temperature from the time a user opens a flow control valve.

SUMMARY OF THE INVENTION

It is therefore the object of the present invention to provide a simple, economical and reliable temperature regulation system for supplying tempered water having a desired set point temperature without significant temperature fluctuation, also having the required system response time.

The system of the invention includes a cold water inlet conduit and a hot water inlet conduit. A three-way, mechanically operated thermostatic mixing valve is provided for mixing the flow of cold water from the cold water inlet conduit with a hot water stream from the hot water inlet conduit. The mixing occurs at effective proportions to deliver tempered water to a tempered water outlet conduit having a desired preset outlet temperature. The thermostatic mixing valve has a temperature actuated flow control element for controlling the relative proportions of hot and cold water mixed in the valve.

A cold water bypass line diverts cold water from the cold water inlet conduit upstream of the thermostatic mixing valve and supplies cold water in a feed back loop to the temperature actuated flow control element of the mechanical thermostatic mixing valve. Cold water from the feed back loop physically floods the flow control element of the thermostatic mixing valve. A modulator valve controls the flow of water passing through the cold water bypass line back to the temperature actuated flow control element of the thermostatic mixing valve. A temperature sensor is located in the tempered water outlet conduit. The modulator valve responds to temperature changes in the tempered water outlet conduit as detected by the temperature sensor located in the tempered water outlet conduit.

A PID controller senses the temperature of the temperature sensor located in the tempered water outlet conduit and applies negative feedback to change the flow control position of the modulator valve to supply more or less cold water to the temperature actuated flow control element of the thermostatic control valve. The result is to shift the operating point of the thermostatic mixing valve to assist thermostatic mixing valve in maintaining the temperature of the temperature water outlet at the desired set point. For example, if the water outlet temperature is too hot, the PID controller reduces the cold water flow through the modulator valve to the thermostatic mixing valve, which causes the temperature sensitive component of the temperature actuated flow control element to falsely read higher and to reduce the flow of hot water input. Conversely, if the water outlet temperature is too cold, the PID controller increases the cold water flow through the modulator valve to the thermostatic mixing valve, which causes the temperature sensitive component of the temperature actuated flow control element to falsely read colder and to increase the flow of hot water input.

Additional objects, features and advantages will be apparent in the written description which follows.

DETAILED DESCRIPTION OF THE INVENTION

Figure 1:
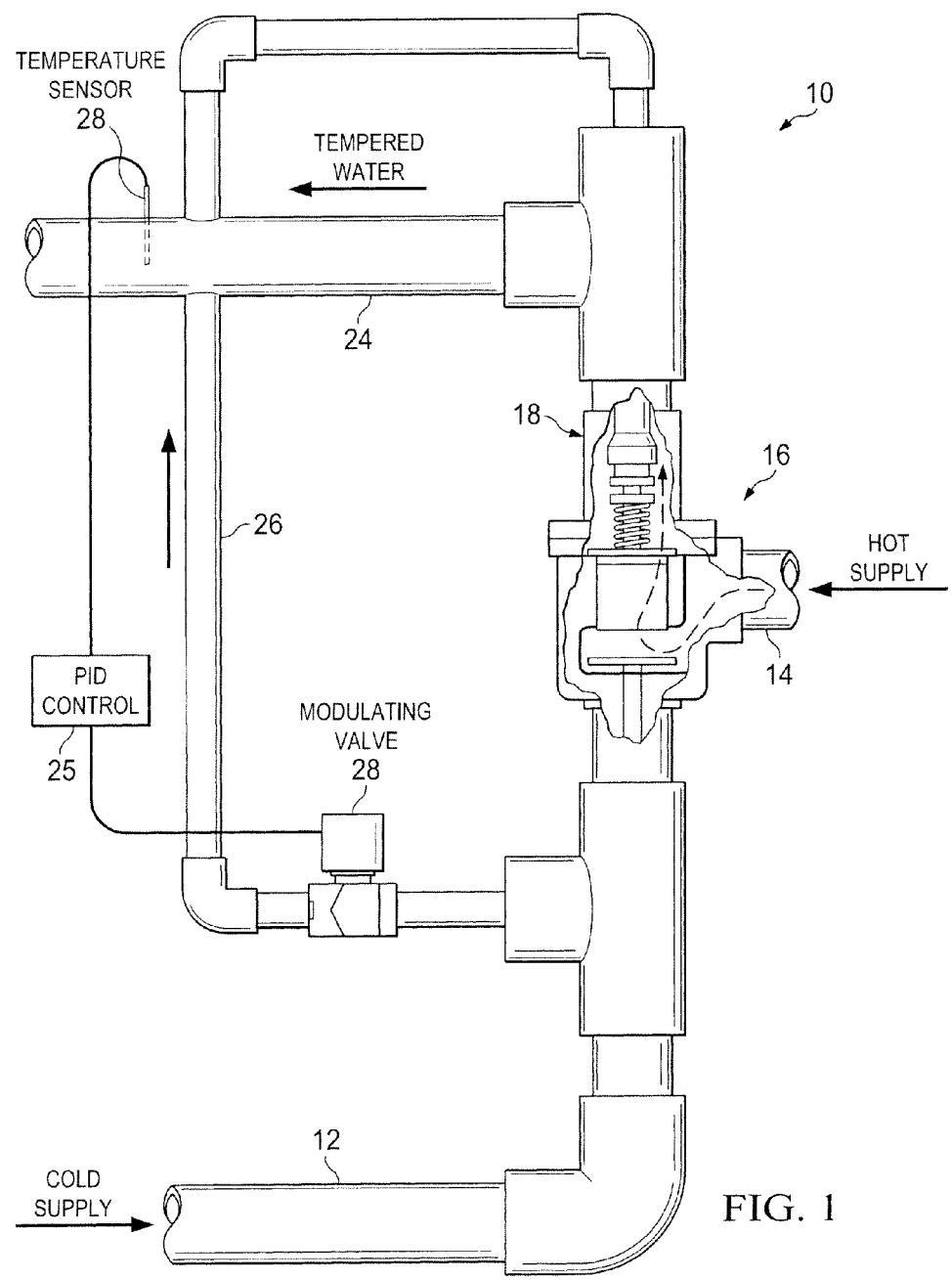
FIG. 1 is a partly schematic operational view of the temperature regulation system of the invention, illustrating the principal components thereof and showing the mechanical thermostatic mixing valve in the hot water only position.
Figure 2:
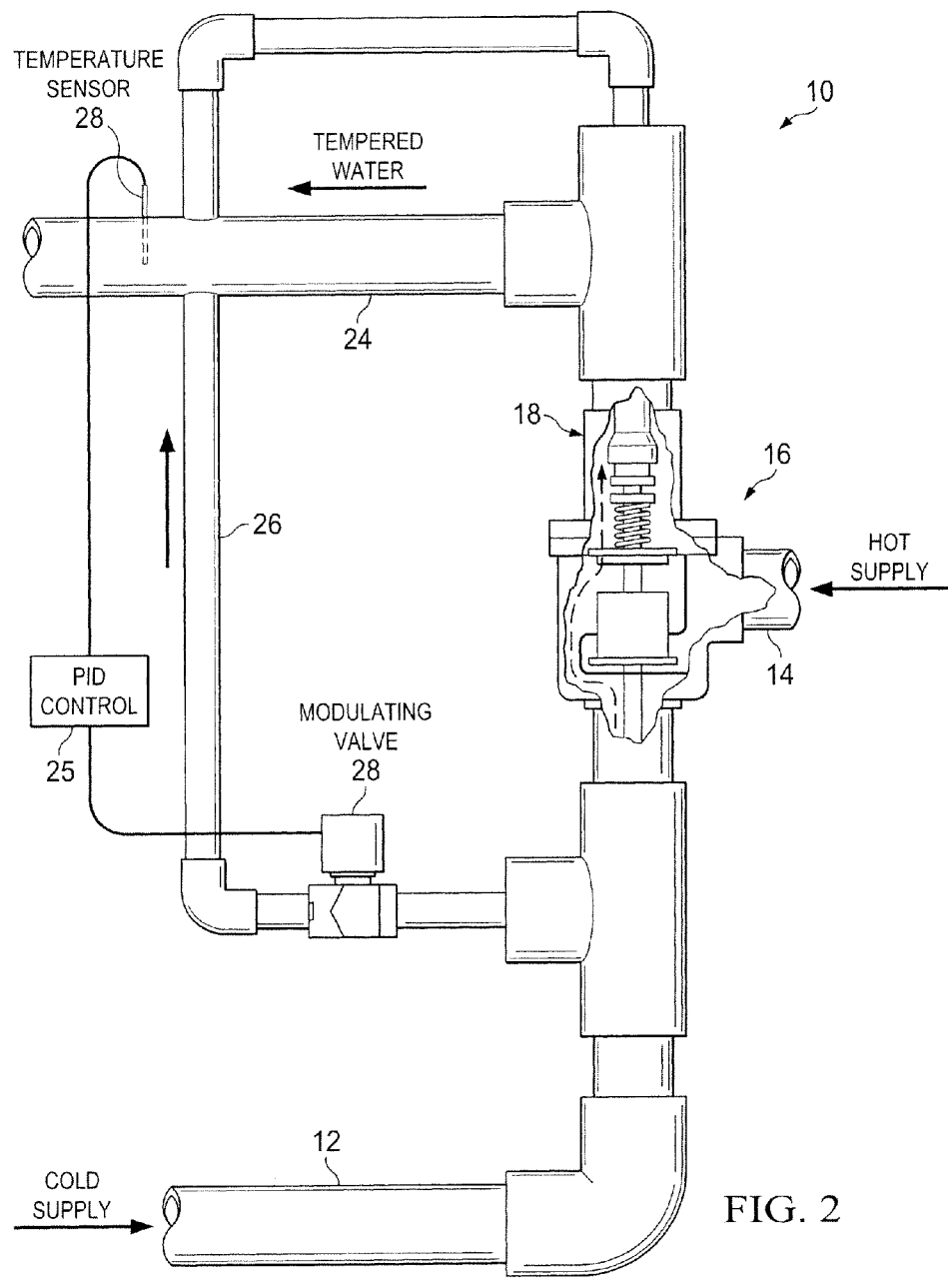
FIG. 2 is a view similar to FIG. 1, but showing the thermostatic mixing valve in the cold only position.
Figure 3:
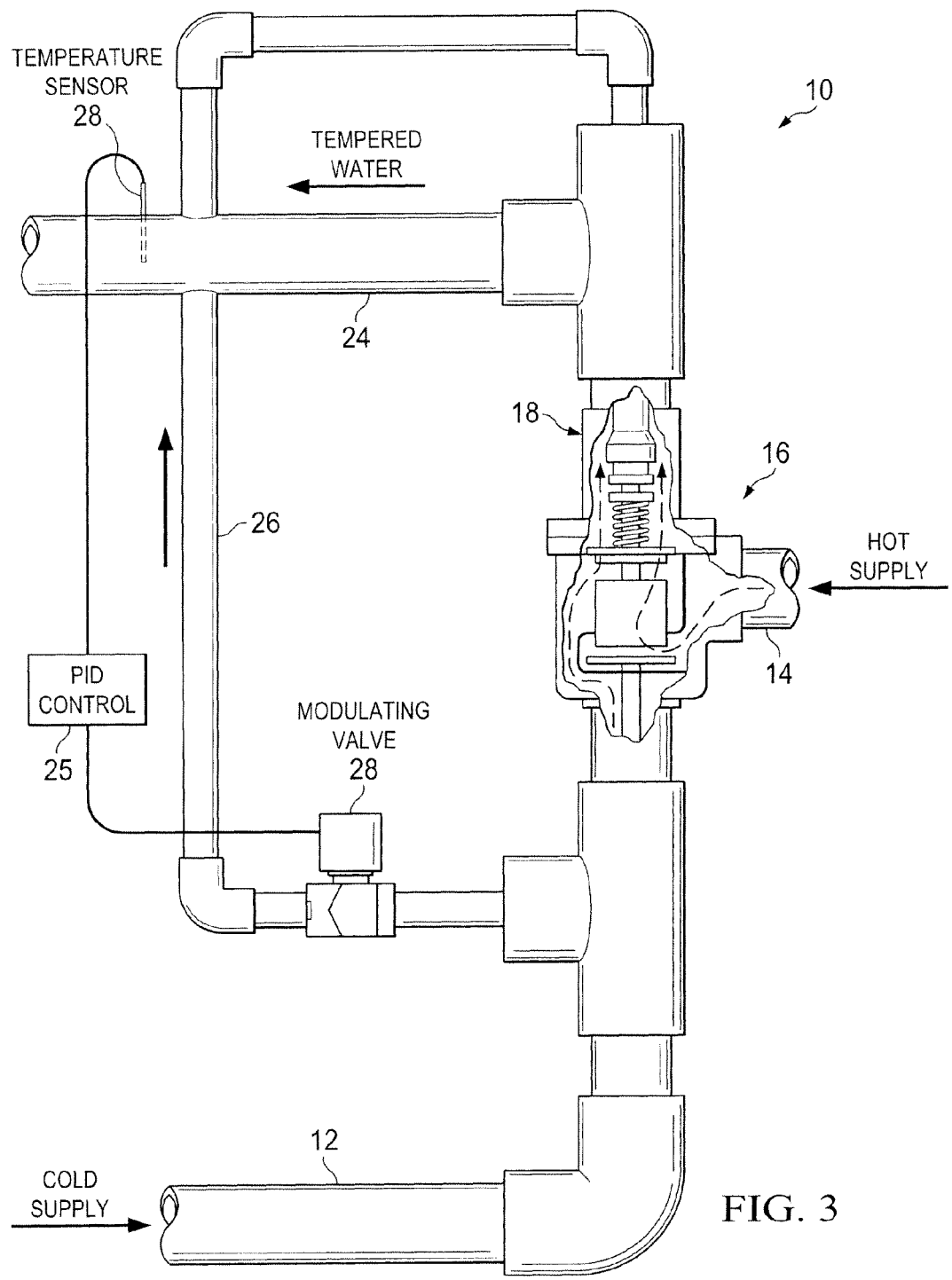
FIG. 3 is a view similar to FIG. 2, but showing the thermostatic mixing valve in the hot and cold water blending position.
Figure 4:
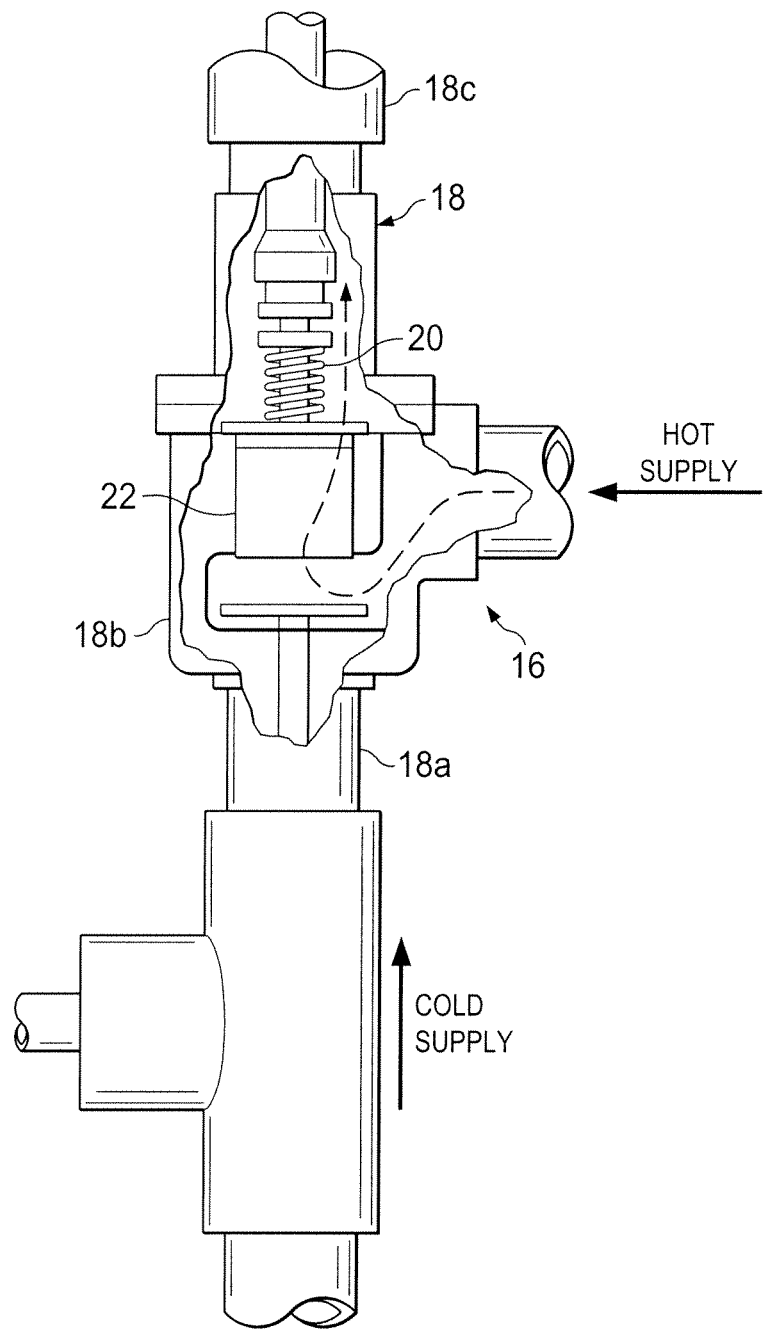
FIGS. 4-6 are close up views of the operation of the mechanical thermostatic mixing valve used in the practice of the invention, showing the valve in the hot only, cold only and hot and cold blending positions, respectively.
Figure 5:
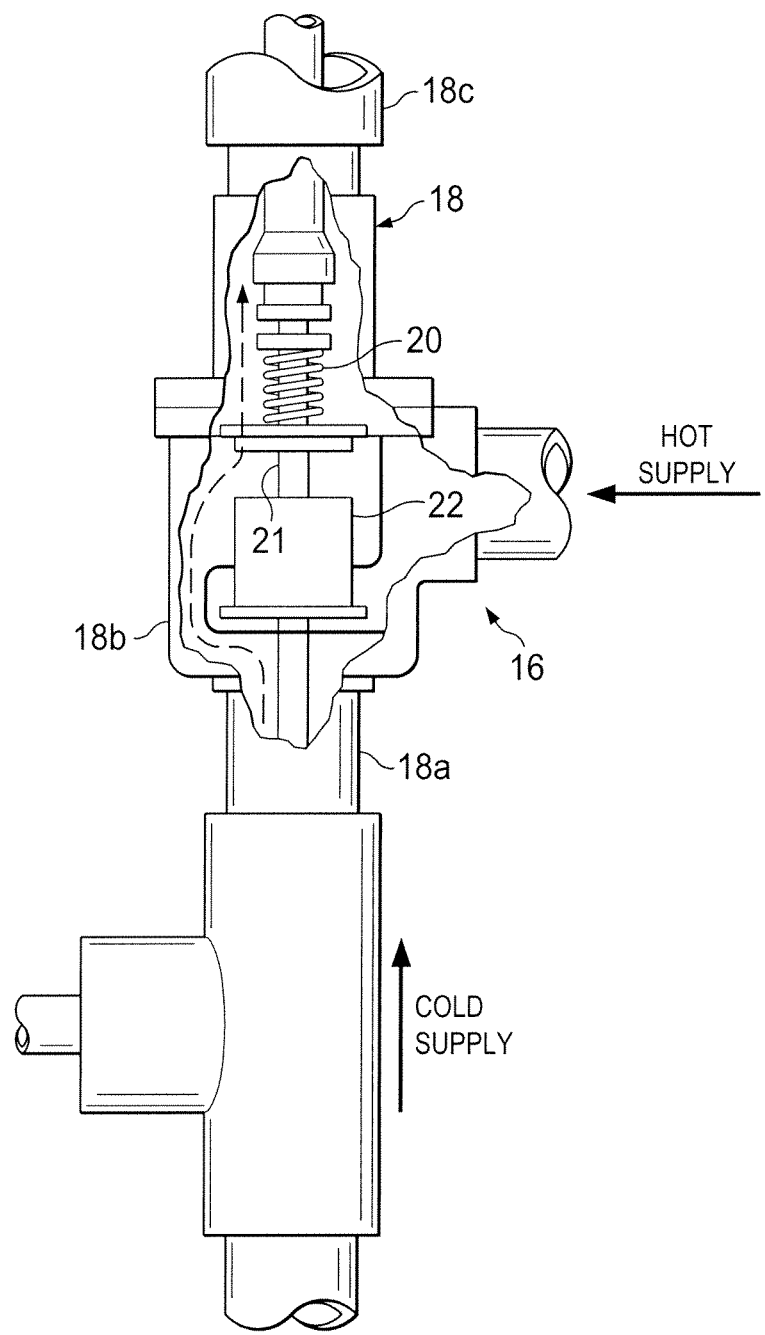
Figure 6:
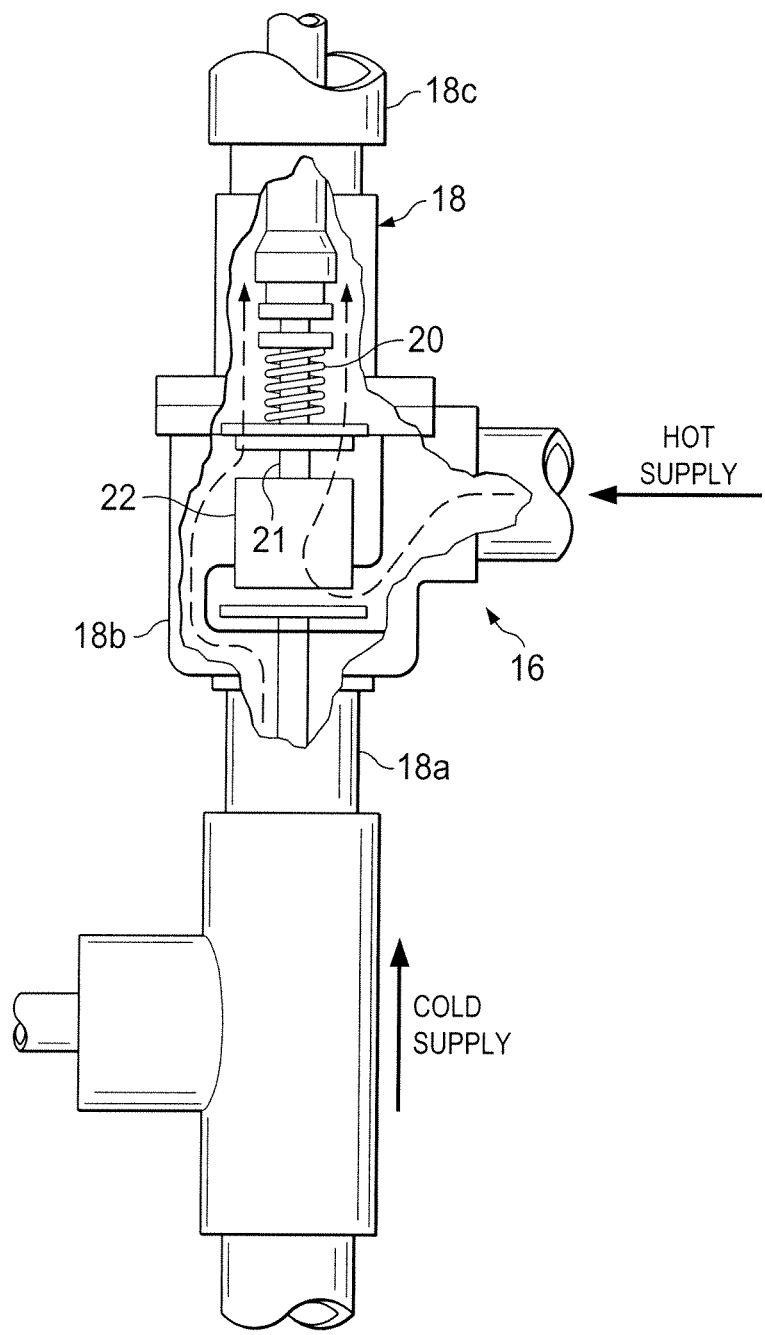

FIGS. 1-3 are simplified, partly schematic views of the temperature regulation system of the invention, showing the operative components there in the hot-only, cold-only, and hot and cold operating positions, respectively. FIGS. 4-6 are close-up views of the thermostatic mixing valve which is used in the system of the invention in the same three operating positions. Thus, with respect to FIG. 1 of the drawings, there is shown the preferred embodiment of the tempered water system 10 of the present invention, having a cold water inlet conduit or supply line 12, a hot water inlet conduit 14 and a three-way mechanically operated thermostatic mixing valve 16.

As can be seen in FIG. 4, the thermostatic mixing valve 16 of the invention comprises a valve body 18 (FIG. 4) having cold-water inlet 18a, hot-water inlet 18b, and a tempered water outlet 18c. The cold-water inlet 18a and hot-water inlet 18b are connectable to the pressurized cold and hot water inlet conduits 12, 14, connected, for example, to plant supply lines. In one particular version of the system of the invention, the hot water supply line can conveniently be taken from the output of any of various types of heat exchangers. Example heat exchangers could be U-tube exchangers, shell and plate exchangers, water heaters and boilers, etc. The valve body 18 defines a chamber which allows for the flow of hot and cold water from the hot and cold water inlets, respectively, as will be apparent from FIG. 4-6. The valve 16 further comprises a temperature actuated flow control element which acts as a thermostatically controlled actuator to control the flow of water thru the valve body. In the discussion which follows, the temperature actuated flow control element will be understood to comprise the coil spring 20, and its associated valve opening and closing sleeve 22. As will be explained, the coil spring acts as a temperature sensing component of the mixing valve and acts upon the valve internal sleeve 22 in response to temperature changes in the metal of the spring.

The mixing valve 16 used in the system of the invention is "mechanically" operated in the sense that changes in temperature act on the spring 20, causing the spring to expand or contract which, in turn, moves the sleeve 22 between the various positions shown in FIGS. 4-6. The coil spring 20 is mounted about a shaft 21 (FIG. 5) and is operatively connected to the slidable valve opening and closing sleeve 22. The valve opening and closing sleeve 22 is displaceable, by the action of spring 20, between one end position (FIG. 4) engaging a cold-water seat, blocking flow from the cold-water inlet and permitting flow from the hot-water inlet and an opposite end position (FIG. 5) engaging a hot-water seat, blocking flow from the hot-water inlet and permitting flow from the cold-water inlet. In intermediate positions (FIG. 6) flow from both cold- and hot-water inlets is permitted through the mixing valve 18 into the tempered water outlet 18c. From this point, the tempered water stream passes through a tempered water outlet conduit (24 in FIG. 1). The tempered water outlet conduit has a temperature sensing element 28 located therein.

The mixing valve 16 is initially set to a desired set point temperature. For example, the valve 16 could be set to allow flow of about 85 percent cold and 15 percent hot water, to achieve a preset outlet temperature of the tempered water in the outlet conduit (24 in FIG. 1) of about 140° F. The temperature of the entering water streams and the desired outflow stream will determine the ultimate operating properties which, of course, are subject to change under actual operation.

The thermostatic mixing valve 18 is thus operatively connected to the cold and hot water inlet conduits for mixing water from the cold and hot water output stream having a desired set point temperature. The coil spring component 20 of the temperature actuated flow control element in mixing valve 16 is capable of expanding or contracting, dependent upon temperature and can act on the valve opening and closing sleeve 22 to move it to keep the temperature of the water in the tempered water outlet conduit substantially constant at the desired set point temperature. To this extent, the thermostatic mixing valve 16 operates in a similar fashion to other mixing and proportioning valves of the prior art.

However, as can be seen in FIGS. 1-3, the system of the invention is provided with a cold water bypass line 26 upstream of the mixing valve 16. The cold water bypass line 26 diverts cold water from the cold water inlet conduit 12 upstream of the thermostatic mixing valve 16 and for supplying cold water in a feed back loop back to the temperature sensing element (spring 20) of the thermostatic mixing valve to flood the temperature sensing element. A modulating valve 28 is also located in the cold water bypass conduit 26 for controlling the flow of water in the cold water bypass conduit. The modulator valve 28 in the cold water bypass conduit controls the amount of water allowed to pass through the bypass conduit back to the sensing element (spring 20) of the thermostatic mixing valve. The modulating valve 28 is an off-the-shelf commercially available product.

As can also be seen in FIGS. 1-3, a proportional integral derivative controller is operatively associated with the modulating valve 28. A proportional integral derivative controller (PID) is a generic control loop feedback mechanism widely used in industrial control systems and will be familiar to those skilled in the relevant arts. The PID controller calculates an "error" value as the difference between a measured process variable and a desired set point. The controller attempts to minimize the error by adjusting the process control inputs. In the instant case, the PID electronic controller is responsive to changes in temperature sensed by the temperature sensing element 28 located in the tempered water outlet conduit 24. The controller 25 may be fabricated from a number of relays, solid state circuitry or a computer with software. Such a device is well within the skill of the ordinary control engineer. It will be understood by those skilled in the relevant are that any type of operative connections can be used to establish communication between the PID controller 25 and the temperature sensor 28. For instance, infrared, radio or other communication means could be used in addition to electrical hard wired connections such as those shown in FIGS. 1-3.

In the present system, the PID 25 controller senses the temperature of the temperature sensor (28 in FIG. 1) located in the tempered water outlet 24 and applies "negative feedback" to change the flow control position of the modulator valve 28 to supply more or less cold water to the sensing element 20 of the thermostatic mixing valve, respectively. The result is to shift the operating point of the thermostatic mixing valve to assist the thermostatic mixing valve in maintaining the temperature of the tempered water outlet at the desired set point. For example, if the water outlet temperature is too hot, the PID controller reduces the cold water flow through the modulator valve to the sensing element 20 of the thermostatic mixing valve, which causes the sensing element to falsely read higher and to reduce the flow of hot water input. Conversely, if the water outlet temperature is too cold, the PID controller increases the cold water flow through the modulator valve to the sensing element of the thermostatic mixing valve 18, which causes the thermostatic mixing valve sensing element to falsely read colder and to increase the flow of hot water input.

The "false" manipulation of the modulating valve and thermostatic mixing valve allow the system to regulate to a higher temperature than the thermostatic mixing valve would normally be capable of reaching. In other words, the mixing valve 16 is set to a desired set point of say 140° F. However, by flooding the sensing element 20 with cold water, the sensing element is fooled and introduces more hot water into the system, raising the outlet temperature to, for example, 160° F.

In a typical operation using the temperature regulation system of the invention, hot water is taken from, for example, a U-tube heat exchanger at about 220° F. and introduced to the hot water inlet conduit 14. Cold water from any suitable source is supplied through the cold water inlet conduit 12. The thermostatic mixing valve is set at a desired blended water outlet temperature set point, for example 140° F. for potable water applications. As has been described, the PID electronic controller 25 acts on the modulating valve 28 and, in turn, on the thermostatic mixing valve 18 in a sort of reverse of normal fashion, in effect providing negative feed back to the modulating valve to open or close the modulating valve to maintain the temperature of the water in the tempered water outlet conduit at the desired set point temperature. By dumping cold water onto the sensing element of the thermostatic mixing valve, the operated point of the valve is falsely manipulated and shifted.

As a result, the electronic controller opens the modulating valve when the temperature detected by the temperature sensing element in the tempered water outlet conduit falls below the desired set point temperature, the flow of cold water acting on the sensing element of the thermostatic mixing valve to falsely read colder and to increase the flow of hot water through the mixing valve. In the opposite situation, the electronic controller closes the modulating valve when the temperature detected by the temperature sensing element in the tempered water outlet conduit rises above the desired set point temperature, the decreased flow of cold water acting on the sensing element of the thermostatic mixing valve to falsely read hotter and to decrease the flow of hot water through the mixing valve.

An invention has been provided with several advantages. The temperature regulation system of the invention is much more economical to construct than the typical prior art systems using more elaborate mixing valves. In many cases, the mixing valves were electronic in nature and much more complicated in overall design. The present system with its mechanically operated thermostatic mixing valve is simple in design and reliable in operation. At a constant flow rate of, for example, 14 gallons per minute, the system will hold the outlet blended water temperature within about a ±2 degree variation. Once the modulating valve settles on a flow rate, the system is extremely accurate. The PID controller prevents the system from overcompensating as the water flow rates fluctuate. The system acts only on the water supply side of the fluid system, and not on the energy side of the system.

Other modifications and advantages will be apparent to those skilled in the relevant art. The system can easily be provided with a fail safe fall back so that, if the electronically controlled modulation system fails in a closed position, the thermostatic valve will revert to its default temperature, for example a safe 120° F. This would, of course, continue to provide the customer with usable hot water.

It should be understood that the above description of the preferred embodiment is given by way of illustration for complying with the statutory requirements of enablement and best mode of patent law. Nothing in the above description should be construed as limiting the scope of the invention as this scope is defined in the appended claims, and changes in the system may become readily apparent to those skilled in the art without departing from the invention described and claimed herein. Thus, while the invention has been shown in only one its forms, it is not thus limited but is susceptible to various changes and modifications without departing from the spirit thereof.

What is claimed is:

1. A system for supplying tempered water, the system comprising:

a cold water inlet conduit connected to a source of cold water;

a hot water inlet conduit connected to a source of hot water;

a thermostatic mixing valve operatively connected to said cold and hot water inlet conduits for mixing water from the cold and hot water inlet conduits into a single tempered water output stream having a desired set point temperature, the thermostatic mixing valve having a temperature sensing element for controlling the mixing valve position to maintain the desired set point temperature in the tempered water output stream;

a tempered water outlet conduit for receiving the tempered water stream, the tempered water outlet conduit having a temperature sensing element located therein;

a cold water bypass line for diverting cold water from the cold water inlet conduit upstream of the thermostatic mixing valve and for supplying cold water directly to the temperature sensing element of the thermostatic mixing valve without being mixed with hot water, to thereby flood the temperature sensing element;

a modulating valve located in the cold water bypass line for controlling the flow of water in the cold water bypass line;

an electronic controller operatively associated with the modulating valve and responsive to changes in temperature sensed by the temperature sensing element located in the tempered water outlet conduit for controlling the flow of cold water to the sensing element of the thermostatic mixing valve.

2. The system of claim 1, wherein the electronic controller opens the modulating valve when the temperature detected by the temperature sensing element in the tempered water outlet conduit falls below the desired set point temperature, the flow of cold water acting on the sensing element of the thermostatic mixing valve to falsely read colder and to increase the flow of hot water through the mixing valve.

3. The system of claim 1, wherein the electronic controller closes the modulating valve when the temperature detected by the temperature sensing element in the tempered water outlet conduit rises above the desired set point temperature, the decreased flow of cold water acting on the sensing element of the thermostatic mixing valve to falsely read hotter and to decrease the flow of hot water through the mixing valve.

4. The system of claim 1, wherein the electronic controller operates using a negative feedback loop, providing negative feedback to the modulating valve to open or close the modulating valve to maintain the temperature of the water in the tempered water outlet conduit at the desired set point temperature.

5. The system of claim 1, wherein the electronic controller is a proportional integral derivative controller.

6. The system of claim 1, wherein the temperature sensing element in the thermostatic mixing valve is a coil spring.

7. The system of claim 1, wherein the hot water inlet conduit is supplied by a heat exchanger.

8. The system of claim 1, wherein the tempered water outlet stream is used to supply potable water to an end user.

9. A system for supplying tempered potable water from a hot water source supplied by a heat exchanger, the system comprising:
 a cold water inlet conduit connected to a source of cold water;
 a hot water inlet conduit connected to a source of hot water;
 a mechanically operated, three-way, thermostatic mixing valve operatively connected to said cold and hot water inlet conduits for mixing water from the cold and hot water inlet conduits into a single tempered water output stream having a desired preset temperature, the thermostatic mixing valve having a temperature sensing element for controlling the mixing valve position to maintain the desired preset temperature in the tempered water output stream, the sensing element acting on a sleeve in the valve interior to open or close the valve;
 a tempered water outlet conduit for receiving the tempered water stream, the tempered water outlet conduit having a temperature sensing element located therein downstream of the thermostatic mixing valve;
 a cold water bypass line for diverting cold water from the cold water inlet conduit upstream of the thermostatic mixing valve and for supplying cold water directly to the temperature sensing element of the thermostatic mixing valve without being mixed with hot water, to thereby flood the temperature sensing element;
 a modulating valve located in the cold water bypass line for controlling the flow of water in the cold water bypass line;
 an proportional integral derivative electronic controller operatively associated with the modulating valve and responsive to changes in temperature sensed by the temperature sensing element located in the tempered water outlet conduit for controlling the flow of cold water to the sensing element of the thermostatic mixing valve; and
 wherein the flow of cold water supplied to the temperature sensing element of the thermostatic mixing valve acts to falsely shift the position of the mixing valve sleeve from a normal operating position.

10. The system of claim 9, wherein the electronic controller opens the modulating valve when the temperature detected by the temperature sensing element in the tempered water outlet conduit falls below the desired set point temperature, the flow of cold water acting on the sensing element of the thermostatic mixing valve to falsely read colder and to increase the flow of hot water through the mixing valve.

11. The system of claim 9, wherein the electronic controller closes the modulating valve when the temperature detected by the temperature sensing element in the tempered water outlet conduit rises above the desired set point temperature, the decreased flow of cold water acting on the sensing element of the thermostatic mixing valve to falsely read hotter and to decrease the flow of hot water through the mixing valve.

12. The system of claim 9, wherein the electronic controller operates using a negative feedback loop, providing negative feedback to the modulating valve to open or close the modulating valve to maintain the temperature of the water in the tempered water outlet conduit at the desired set point temperature.

13. The system of claim 9, wherein the temperature sensing element in the thermostatic mixing valve is a coil spring.

* * * * *